US011984102B2

(12) United States Patent
Mori

(10) Patent No.: US 11,984,102 B2
(45) Date of Patent: May 14, 2024

(54) SOUND EFFECT GENERATION METHOD AND INFORMATION PROCESSING DEVICE

(71) Applicant: Roland Corporation, Shizuoka (JP)

(72) Inventor: Hiroaki Mori, Shizuoka (JP)

(73) Assignee: Roland Corporation, Shizuoka (JP)

( * ) Notice: Subject to any disclaimer, the term of this patent is extended or adjusted under 35 U.S.C. 154(b) by 582 days.

(21) Appl. No.: 17/283,952

(22) PCT Filed: Oct. 9, 2018

(86) PCT No.: PCT/JP2018/037632
§ 371 (c)(1),
(2) Date: Apr. 8, 2021

(87) PCT Pub. No.: WO2020/075225
PCT Pub. Date: Apr. 16, 2020

(65) Prior Publication Data
US 2021/0383782 A1 Dec. 9, 2021

(51) Int. Cl.
*G10H 1/053* (2006.01)
*G10H 1/00* (2006.01)

(52) U.S. Cl.
CPC .......... *G10H 1/053* (2013.01); *G10H 1/0008* (2013.01); *G10H 2210/281* (2013.01); *G10H 2250/105* (2013.01); *G10H 2250/121* (2013.01)

(58) Field of Classification Search
CPC ................ G10H 1/053; G10H 1/0008; G10H 2210/281; G10H 2250/105; G10H 2250/121
USPC .......................................................... 84/630
See application file for complete search history.

(56) References Cited

U.S. PATENT DOCUMENTS 5,195,140 A * 3/1993 Kudo .................. G10H 1/0091 84/630
6,111,962 A * 8/2000 Akio ...................... G10K 15/12 381/104
6,696,633 B2 * 2/2004 Miyagishima ....... G10H 1/0091 381/103
7,876,909 B2 * 1/2011 Neoran ................ G10H 1/0091 381/63
7,947,891 B2 * 5/2011 Nakae ...................... G10H 7/12 84/630
8,634,568 B2 * 1/2014 Neoran ................ G10H 1/0091 381/63
10,115,379 B1 * 10/2018 Juszkiewicz ............ G10H 1/46
(Continued)

FOREIGN PATENT DOCUMENTS

CA 2935339 C * 7/2019 ............ G10K 15/12
CN 101924317 A * 12/2010
(Continued)

OTHER PUBLICATIONS

Office Action of Japan Counterpart Application, with English translation thereof, issued on Feb. 8, 2022, pp. 1-7.
(Continued)

*Primary Examiner* — Christina M Schreiber
(74) *Attorney, Agent, or Firm* — JCIPRNET

(57) ABSTRACT

This sound effect generation method includes: generating a sound effect with respect to a sound by using an all-pole filter having a coefficient generated on the basis of an actual measurement value of impulse response; and outputting the sound effect.

20 Claims, 12 Drawing Sheets

(56) References Cited

U.S. PATENT DOCUMENTS

| | | | | |
|---|---|---|---|---|
| 2005/0213772 | A1* | 9/2005 | Cheng | H04S 1/002 84/630 |
| 2007/0253564 | A1* | 11/2007 | Katayama | H04S 3/008 84/630 |
| 2021/0383782 | A1* | 12/2021 | Mori | G10K 15/08 |
| 2021/0383788 | A1* | 12/2021 | Hashimoto | G10L 25/51 |

FOREIGN PATENT DOCUMENTS

| | | | | | |
|---|---|---|---|---|---|
| EP | 2063413 | B1 | * | 2/2010 | G10H 1/0091 |
| JP | H03290698 | | | 12/1991 | |
| JP | H03290698 | A | * | 12/1991 | |
| JP | H06259087 | | | 9/1994 | |
| JP | H06259087 | A | * | 9/1994 | |
| JP | 2998482 | | | 1/2000 | |
| JP | 2000315937 | | | 11/2000 | |
| JP | 2007001507 | A | * | 1/2007 | |
| JP | 2008299005 | | | 12/2008 | |
| JP | 5682116 | B2 | * | 3/2015 | |
| JP | 2015128208 | | | 7/2015 | |
| KR | 20160136716 | A | * | 11/2016 | |
| RU | 2499301 | C2 | * | 11/2013 | G10L 19/008 |

OTHER PUBLICATIONS

"International Search Report (Form PCT/ISA/210) of PCT/JP2018/037632," mailed on Jan. 8, 2019, with English translation thereof, pp. 1-4.

* cited by examiner

FIR
amplitude

FREQUENCY

ALL-POLE FILTER
amplitude

FREQUENCY

ALL-POLE FILTER + COMB FILTER
amplitude

FREQUENCY

| | |
|---|---|
| place A | location a1<br>location a2<br>location a3<br>⋮ |
| place B | location b1<br>location b2<br>location b3<br>⋮ |
| place C | location c1<br>location c2<br>location c3<br>⋮ |

⋮

FIG. 12

SOUND EFFECT GENERATION METHOD AND INFORMATION PROCESSING DEVICE

CROSS-REFERENCE TO RELATED APPLICATION

This application is a 371 application of the International PCT application serial no. PCT/JP2018/037632, filed on Oct. 9, 2018. The entirety of the above-mentioned patent application is hereby incorporated by reference herein and made a part of this specification.

TECHNICAL FIELD

The present invention relates to a sound effect generation method and an information processing device.

BACKGROUND ART

There are sound effect addition devices that add sound effects such as reverberant sounds in halls or the like and resonant sounds of musical instruments to sounds output from electronic musical instruments and sound reproduction devices. In general, filter processing is performed on digital sound data, and sound effects such as reverberant sounds and resonant sounds are output.

The filter processing to add sound effects includes, for example, convolution (also referred to as a convolution reverberation) of impulse responses using a finite impulse response (FIR) filter (see Patent Literature 1, for example). Alternatively, there is a scheme of performing convolution of impulse responses in a frequency domain using fast Fourier transform (FFT). Also, there is a method of generating impulse responses in a pseudo manner with a multi-stage configuration of an all-pass filter (APF) called a Schroeder scheme. Moreover, there is a circuit causing resonant sounds and reverberant sounds to be generated using a comb filter (see Patent Literature 2, for example).

CITATION LIST

Patent Literature

[Patent Literature 1]
Japanese Patent Laid-Open No. 2008-299005
[Patent Literature 2]
Japanese Patent No. 2998482

SUMMARY

Technical Problem

In the scheme of performing convolution of impulse responses using an FIR filter (referred to as a first scheme), there are suitable real-time properties (the property of following the output of musical sound) and degrees (degrees of naturalness (quality)) indicating to what extent a natural sound is achieved. However, in this case there is a disadvantage that the amount of computation becomes huge. An advantage and a disadvantage of a scheme of performing convolution of impulse responses using FFT (second scheme) are suitable quality but poorer real-time properties than those of the first scheme. Also, in the Schroeder scheme (third scheme), more suitable real-time properties and an amount of computation are achieved while the quality is degraded as compared with those of the first and second scheme.

An object of the present invention is to provide a sound effect generation method and an information processing device capable of generating sound effects with satisfactory quality while reducing the amount of computation.

Solution to Problem

According to an aspect of the present invention, there is provided a sound effect generation method including: generating a sound effect with respect to a sound by using an all-pole filter having a plurality of coefficients generated on a basis of an actual measurement value of an impulse response; and outputting the sound effect.

In the sound effect generation method, an order of the all-pole filter may be changed in accordance with designation of the order of the all-pole filter. Also, in a case in which a number of coefficients to be set for the all-pole filter is designated, the designated number of coefficients may be selected in accordance with a predetermined selection method, and values of remaining coefficients may be set to zero.

Also, in the sound effect generation method, a sound effect with a reverberation property at a location where the impulse response is measured may be generated using a comb filter having at least one comb filter module that has one or more sets, each of which includes an extraction unit that extracts a specific band component from the sound effect and an attenuation unit that attenuates the extracted specific band component at a predetermined attenuation rate.

In the sound effect generation method, the specific band component and the predetermined attenuation rate may be generated on the basis of the actual measurement value of the impulse response. Moreover, the impulse response may be selected from a plurality of impulse responses measured at mutually different places. In regard to the measurement places, a case in which the measurement places (such as buildings) are different and a case in which locations are different while the measurement places are the same are included. Also, the sound effect generation method includes, storing a configuration in which a plurality of parameter sets related at least to one of the all-pole filter and the comb filter corresponding to the plurality of impulse responses and setting a parameter set selected from the plurality of parameter sets for at least one of the corresponding all-pole filter and the comb filter may be employed.

According to another aspect of the present invention, there is provided an information processing device including: a generation unit that generates a sound effect with respect to a sound by using an all-pole filter having a plurality of coefficients generated on a basis of an actual measurement value of an impulse response; and an output unit that outputs the sound effect.

Also, according to another aspect of the present invention, there is provided an electronic musical instrument including: a filter that outputs a sound signal which is formed on the basis of an actual measurement value of an impulse response at a measurement place selected from a plurality of impulse responses acquired at a plurality of measurement places and is obtained by adding a reverberant sound at the selected measurement place to an input sound signal.

BRIEF DESCRIPTION OF THE DRAWINGS

FIG. 12 illustrates an example of a screen for designating a parameter set.

DESCRIPTION OF THE EMBODIMENTS

Hereinafter, a sound effect generation method and a sound effect generation device according to an embodiment will be described with reference to the drawings. The configuration of the embodiment is one example, and the present invention is not limited to the configuration. In the present embodiment, a method and a device that generates (creates) reverberant sounds and resonant sounds to be added to music sounds output from an electronic musical instrument and a sound reproduction device (audio equipment) will be described as an example of sound effects.

<Configuration Example of Sound Effect Generation Device>

Figure 1:
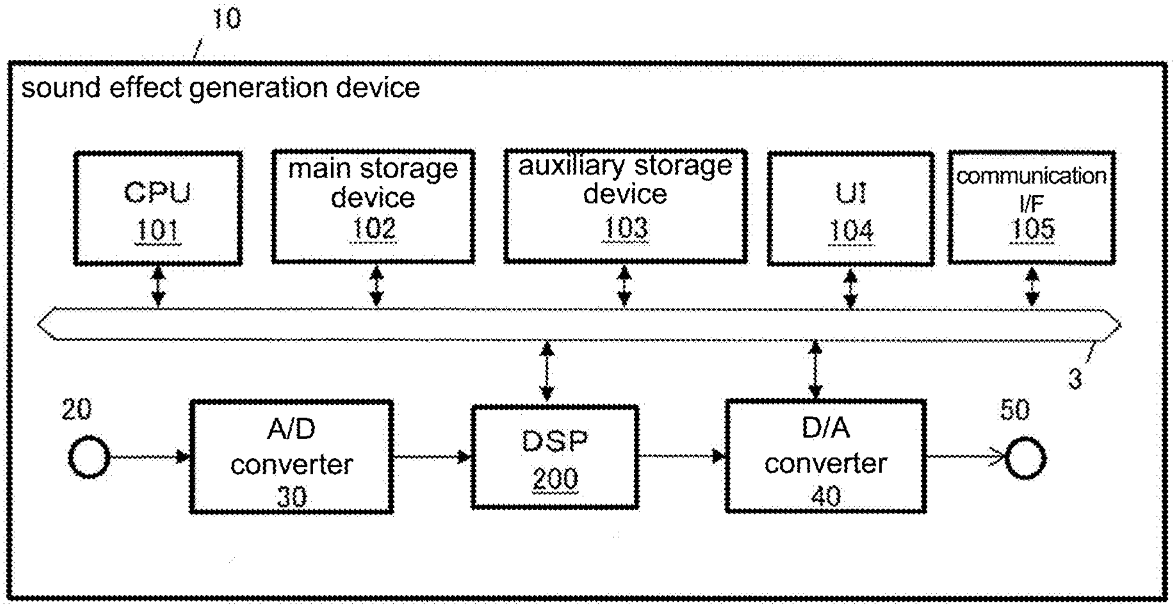
FIG. 1 is a diagram illustrating a configuration example of a sound effect generation device according to an embodiment.

FIG. 1 is a diagram illustrating a configuration example of a sound effect generation device according to an embodiment. A sound effect generation device 10 is a device that adds sound effects (acoustic effects) to music sounds by generating sound effect signals through digital signal processing of input sound (music sound) signals and outputting the sound effect signals along with the music sound signals.

In FIG. 1, the sound effect generation device 10 includes an input terminal 20, a sound analog/digital (A/D) converter 30 connected to the input terminal 20, a digital signal processor (DSP) 200 connected to the A/D converter 30, a digital/analog (D/A) converter 40 connected to the DSP 200, and an output terminal 50 (one example of an output unit).

The input terminal 20 is a terminal for inputting sound signals (music sound signals). Sound signals output from electronic musical instruments and sound signals output from audio equipment are input to the input terminal 20. The A/D converter 30 converts the input sound signals into digital signals and inputs the digital signals to the DSP 200. The DSP 200 performs digital signal processing on the sound signals to generate signals, which are sound signals with sound effects added thereto, and outputs the signals to the D/A converter 40. Output signals (analog signals) from the D/A converter 40 are output from the output terminal 50. An amplifier is connected to the output terminal 50, and a speaker is connected to the amplifier. The sound signals output from the output terminal 50 are amplified by the amplifier and are then output from a speaker as sound.

Also, a sound file may be stored in a main storage device 102 or an auxiliary storage device 103, and a CPU 101 may convert the sound file into digital signals and input the digital signals to the DSP 200. A format of the sound file is an MP3 type, a WAVE type, or the like. However, format types other than MP3 and WAVE types may also be employed.

Also, although a configuration corresponding to one channel is illustrated in the example illustrated in FIG. 1, two or more systems for processing sound signals may be provided in accordance with the number of sound channels. Also, the sound effect generation device 10 may be provided with a wired or wireless communication interface (communication I/F) 105 such as a local area network (LAN) card.

The DSP 200 is connected to the central processing unit (CPU) 101, the main storage device 102, the auxiliary storage device 103, and a user interface (UI) 104 via a bus 3. The DSP 200 is a processor specialized for digital signal processing. In the present embodiment, the DSP 200 performs processing specialized for sound signal processing under control of the CPU 101.

The main storage device 102 includes a read only memory (ROM) and a random access memory (RAM). The ROM stores programs executed by the CPU 101 and data used when the programs are executed. The RAM is used as a region where the programs are developed, a data storage region, a work region for the CPU 101, a buffer region for communication data, and the like.

The auxiliary storage device 103 is used as a storage region for data and programs. The auxiliary storage device 103 is, for example, a hard disk, a solid state drive (SSD), an electrically erasable programmable read-only memory (EEPROM), a flash memory, or the like.

Various kinds of processing is performed by the programs stored in the ROM and the auxiliary storage device 103 being loaded on the RAM and being executed by the PU 101. A part or an entirety of the processing performed by the CPU 101 may be performed by a plurality of CPUs (processors) or may be performed by a CPU with a multi-core configuration. Also, a part or an entirety of the processing performed by the CPU may be executed by a processor (such as a DSP or a GPU) other than the CPU, an integrated circuit (such as an application specific integrated circuit (ASIC), a field programmable gate array (FPGA), or the like other than the processor, or a combination of a processor and an integrated circuit (such as a micro processing unit (MPU) or a system-on-a-chip (Soc)).

The UI 104 includes an input device and an output device. The input device is used to input data and information to the sound effect generation device 10. The input device includes a key, a button, a pointing device, a touch panel, an adjustment knob, and the like. The output device is a display or the like. The UI 104 may include a sound input device and a sound output device such as a microphone and a speaker. The communication I/F 105 manages communication processing. Any communication standards may be applied, and wired communication such as a LAN or a USB and wireless communication such as a wireless LAN or Bluetooth (registered trademark) may be used.

As described above, the sound effect generation device 10 may be an independent device connected as a so-called effector device to an electronic musical instrument or audio equipment or may be incorporated in an electronic musical instrument or audio equipment as a part thereof.

<Processing Performed by DSP>

Next, processing performed by the DSP 200 will be described. The DSP 200 generates sound effects by performing digital filter processing on sound signals input to the DSP 200. Although the sound effects can include reverberant sounds at places (such as a hall or a studio) where the sounds are output and resonant sounds of instruments, the sound effects can include sounds other than these sounds. In the present embodiment, a case of a reverberant sound at a place where a sound is output will be described as an example of the sound effects.

Figure 2:
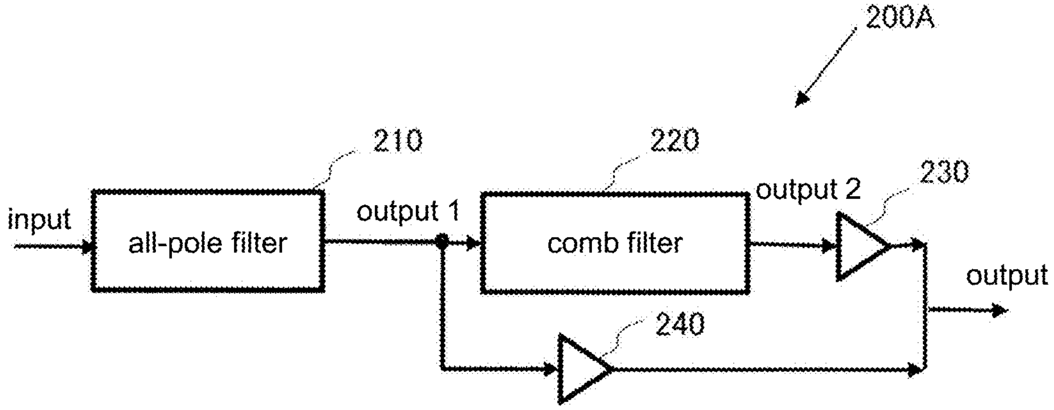
FIG. 2 illustrates a configuration example of a digital filter realized by a DSP.

The DSP 200 operates as a digital filter that generates sound effect signals from sound signals through execution of a program. FIG. 2 illustrates a configuration example of a digital filter 200A realized by the DSP 200.

In FIG. 2, the digital filter 200A realized by the DSP 200 includes an all-pole filter 210, a comb filter (comb-type filter) 220 connected to the all-pole filter 210, a multiplier 230, and a multiplier 240. A sound signal output from the A/D converter 30 is input as an input signal to the digital filter 200A. The input signal is input to the all-pole filter 210. An output signal (output 1) from the all-pole filter 210 is input to the comb filter 220 and the multiplier 240. An output signal (output 2) from the comb filter 220 is input to the multiplier 230. The multiplier 230 multiples the output signal (output 2) from the comb filter 220 by a predetermined coefficient. Also, the multiplier 240 multiplies the output signal (output 1) from the all-pole filter 210 by a predetermined coefficient. In one example, it is considered that the coefficient multiplied by one of the multiplier 230 and the multiplier 240 is set to 1 (ON) while the coefficient multiplied by the other one is adjusted to be between 1 to 0.

Also, when the coefficient multiplied by the multiplier 230 is 1 and the coefficient multiplied by the multiplier 240 is 0, the output signal from the comb filter 220 becomes an output of the digital filter 200A. On the other hand, when the coefficient multiplied by the multiplier 230 is 0 and the coefficient multiplied by the multiplier 240 is 1, the output signal from the all-pole filter 210 becomes an output of the digital filter 200A. A sound signal obtained by adding a reverberant sound as a sound effect to an original sound signal is output from the digital filter 200A. The sound signal output from the digital filter 200A is input to the D/A converter 40, is converted into an analog signal, and is then output from the output terminal 50, for example. Alternatively, it is also possible to store (save) digital data of the sound signal in the main storage device 102 or the auxiliary storage device 103.

Figure 3:
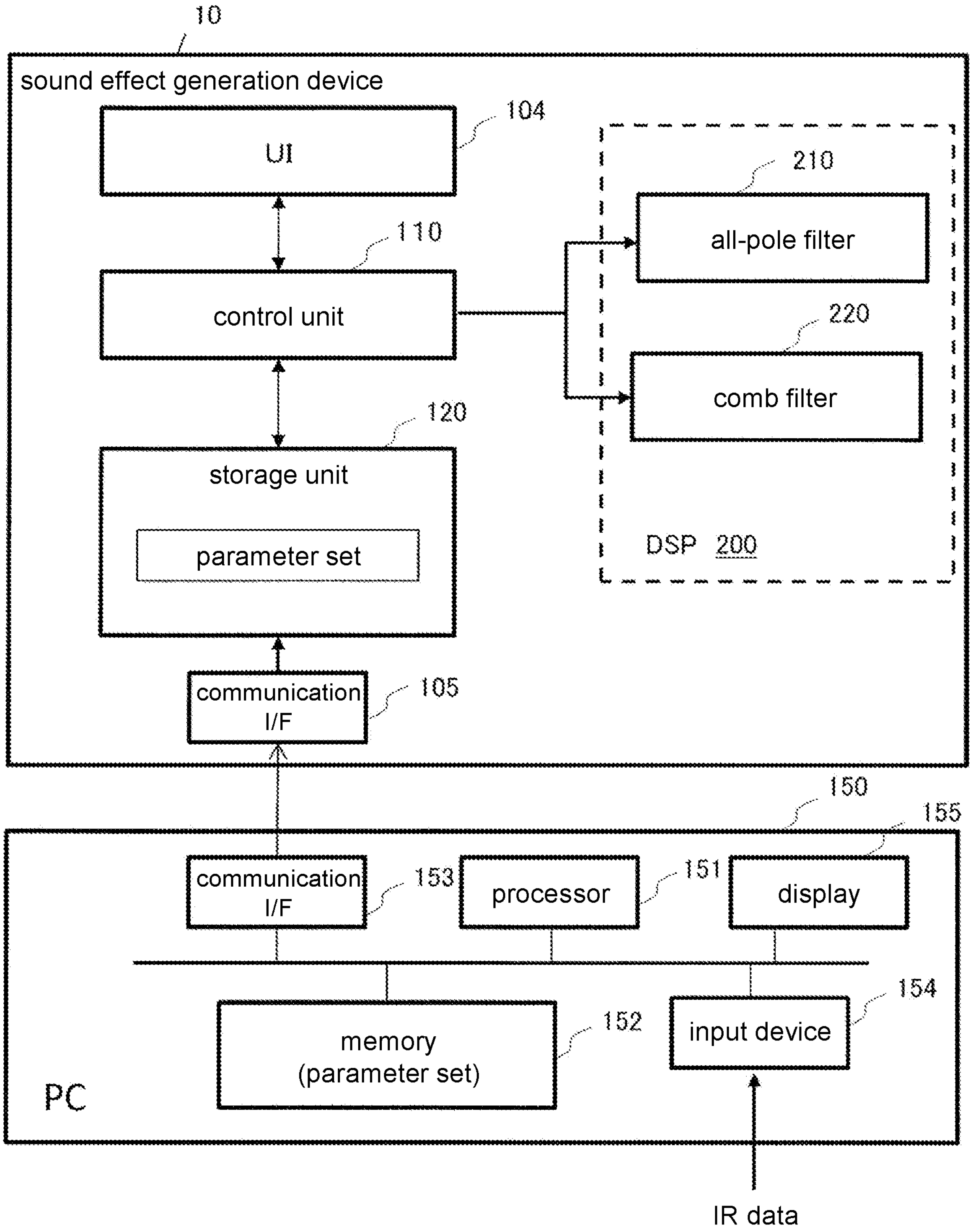
FIG. 3 is an explanatory diagram of data setting for the DSP (an all-pole filter and a comb filter).

FIG. 3 is an explanatory diagram of data setting for the all-pole filter 210 and the comb filter 220. The CPU 101 operates as a control unit 110 through execution of a program. At least one of the main storage device 102 and the auxiliary storage device 103 operates as a storage unit 120. The DSP 200 operates as a sound effect generation unit. In other words, the DSP 200 can operate as the all-pole filter 210 and the comb filter 220 as described above.

The storage unit 120 stores data of a parameter set to be set for the all-pole filter 210 and data of a parameter set to be set for the comb filter 220. The control unit 110 causes the DSP 200 to operate as the all-pole filter 210 by reading the parameter set for the all-pole filter 210 from the storage unit 120 and setting the parameter set in the DSP 200. Also, the control unit 110 causes the DSP 200 to operate as the comb filter 220 by reading the parameter set for the comb filter 220 from the storage unit 120 and setting the parameter set in the DSP 200. Details of each parameter set will be described later.

In the present embodiment, the parameter sets of the all-pole filter 210 and the comb filter 220 are generated by a personal computer (PC) 150 in one example. However, the generation of the parameter sets may be performed by the sound effect generation device 10 or may be a device other than the sound effect generation device 10 and the PC 150. Each of the sound effect generation device 10 and the PC 150 is an example of the "information processing device". A processor 151 included in the PC 150 operates as the "control unit".

Figure 4:
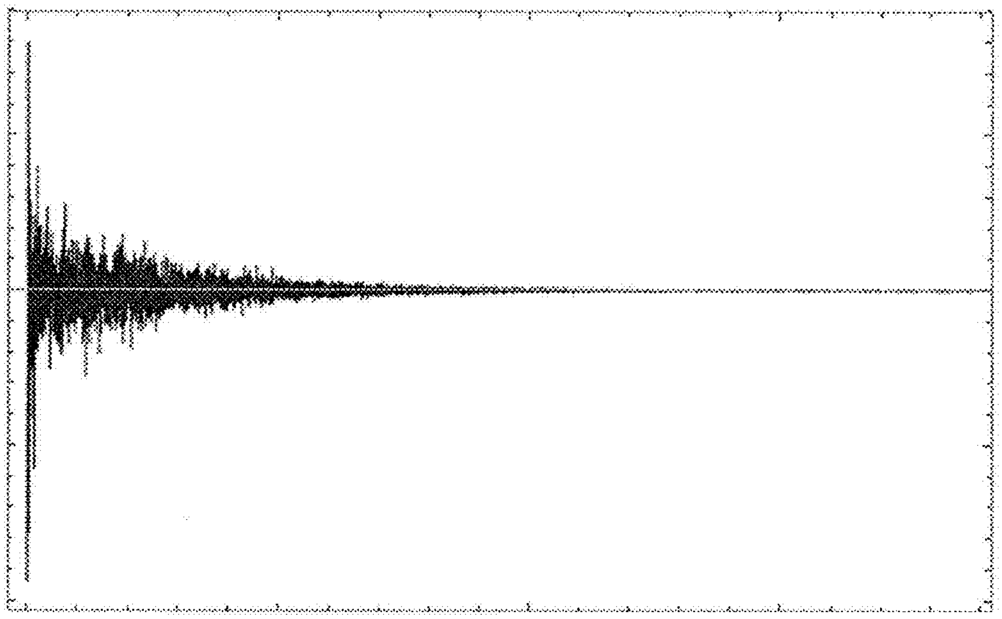
FIG. 4 illustrates an example of an impulse response (IR).

The PC 150 includes the processor 151, a memory 152, a communication interface (communication I/F) 153, an input device 154, and a display 155 connected to each other via a bus. Hereinafter, generation of the parameter set of the all-pole filter 210 will be described. The input device 154 is used to input impulse response data (IR data) to the PC 150. An impulse response indicates an output of a system when a temporally very short signal, which is called an impulse, is input (see FIG. 4). Data of a finite impulse response (FIR) is stored in the memory 152.

The processor 151 performs conversion processing of converting the FIR into an infinite impulse response (IIR) with an order (higher order) of a predetermined number or more. The order is determined in consideration of performance or processing capability of the DSP 200. The processor 151 converts the data of the FIR filter into an IIR filter (all-pole filter) with a predetermined order. In this manner, the amount of data of the filter is compressed, and the amount of computation is reduced. The order can appropriately be set.

An example of a method for all-polarization of the FIR filter will be described below. For all-polarization of the filter, linear predictive coding (LPC), for example, is used. An LPC prediction model is represented by Equation (1) below, for example. The right side (y^[n]) in Equation (1) denotes a prediction signal value, y[n−i] denotes a value observed in advance, and α[i] denotes a prediction coefficient. k denotes an order.

[Math 1]

$$\hat{y}[n] = -\sum_{i=1}^{k} a[i] \times y[n-i] \tag{1}$$

In Equation (1), square errors with the original signal (y[t]) are represented by Equation (2) below. A prediction coefficient α[i] with which the sum of the square errors becomes minimum is obtained. Equation (2) is deformed to Equation (3), and Equation (4) of an error function E is obtained on the assumption of α[0]=1.

[Math 2]

$$E = \sum_{n=-\infty}^{\infty} (y[n] \times -\hat{y}[n])^2 \tag{2}$$

[Math 3]

$$E = \sum_{n=-\infty}^{\infty} \left( y[n] - \left( -\sum_{i=1}^{k} a[i] \times y[n-i] \right) \right)^2 \tag{3}$$

-continued

[Math 4]

$$E = \sum_{n=-\infty}^{\infty}\left(\sum_{i=0}^{k} a[i] \times y[n-i]\right)^2 \quad (4)$$

If partial differentiation of the error function E is performed, Equation (5) is obtained. Here, j=1, . . . , k. If Equation (5) is deformed, then Equation (6) is obtained, and this can be expressed as Equation (7) on the assumption that n'=n−j.

[Math 5]

$$\frac{\partial E}{\partial a[j]} = 0 \quad (5)$$

[Math 6]

$$\frac{\partial E}{\partial a[j]} = 2\sum_{n'=-\infty}^{\infty} 2y[n-j]\sum_{i=0}^{k} a[i]y[n-i] = 0 \quad (6)$$

[Math 7]

$$\frac{\partial E}{\partial a[j]} = 2\sum_{i=0}^{k} a[i] \sum_{n'=-\infty}^{\infty} y[n']y[n'+j-i] = 0 \quad (7)$$

Equation (7) is k simultaneous equations, and an autocorrelation function has been introduced. The autocorrelation function includes elements as represented by Equation (8) below and can be expressed by a Yule-Walker equation as Equation (9). The matrix on the left side in Equation (8) is a Toeplitz matrix, and it is possible to quickly obtain an LPC coefficient (prediction coefficient) and an LPC order, which are solutions of properties of the Toeplitz matrix, with an algorithm called Levinson-Durbin Recursion using the properties. The processor 151 obtains the aforementioned Yule-Walker equation using input (stored in the memory 152) IR data and preset order k, for example, and then obtains the LPC coefficient by the Levinson-Durbin Recursion, through execution of a program. Such calculation of the LPC coefficient performed by the processor 151 is automatically performed through the execution of the program.

[Math 6]

$$R_0 = 2\left(\sum_{i=-\infty}^{\infty} y[i]^2\right) \quad (8)$$

$$R_1 = 2\left(\sum_{i=-\infty}^{\infty} y[i] \times y[i+1]\right)$$

$$R_2 = 2\left(\sum_{i=-\infty}^{\infty} y[i] \times y[i+2]\right)$$

$$\vdots$$

-continued

[Math 7]

$$\begin{pmatrix} R_1 & R_0 & R_1 & \cdots & R_{k-1} \\ R_2 & R_1 & R_0 & \cdots & R_{k-2} \\ \cdot & \cdot & \cdot & & \cdot \\ \cdot & \cdot & & \cdot & \cdot \\ \cdot & \cdot & & \cdot & \cdot \\ R_{k-1} & R_{k-2} & \cdots & R_0 & R_1 \\ R_k & R_{k-1} & \cdots & R_1 & R_0 \end{pmatrix} \begin{pmatrix} 1 \\ a[1] \\ a[2] \\ \cdot \\ \cdot \\ a[k] \end{pmatrix} = \begin{pmatrix} 0 \\ 0 \\ \cdot \\ \cdot \\ \cdot \\ 0 \end{pmatrix} \quad (9)$$

A signal based on the FIR data, that is, a signal of the IR can be predicted using the LPC coefficient and the LPC order. Here, in a case in which the number of multiplications (number of computations) in the convolution computation in the FIR is 50000, for example, the LPC order (the number of k) can be defined such that the number of computations decreases to 10000, for example, through the all-polarization (conversion into the IIR filter). The LPC coefficient and the LPC order are stored as a parameter set of the all-pole filter 210 in the memory 152. In the parameter set of the all-pole filter 210, it is possible to reduce the amount of data and the amount of computation to be stored by setting the order (LPC order) to be a number that is smaller than the order of the FIR. The parameter set for the all-pole filter 210 is read from the memory 152, for example, is transmitted from the communication I/F 153 to the communication I/F 105, and is stored in the storage unit 120. The control unit 110 sets the parameter set (the coefficient and the order) of the all-pole filter 210 in the DSP 200 and brings the all-pole filter 210 into an activated state.

Also, a user of the PC 150 (a user of the sound effect generation device 10), for example, can designate the number of the coefficients of the all-pole filter 210 using the input device 154 such that the coefficients (weights) of the all-pole filter 210 are sparse (many coefficient values are zero). In a case in which the number of the coefficients is designated, the processor 151 selects a predetermined selection method and the designated number of coefficients in a descending order of absolute values of the coefficients, for example, and set values of the remaining coefficients to zero. The amount of computation is reduced by the coefficients becoming sparse. In a case in which the number of multiplications (the number of computations) in the all-pole filter 210 is 10000, for example, it is possible to set the number of computations to a desired number, for example, 5000 by causing the coefficients to be sparse.

<<All-Pole Filter>>

Figure 5:
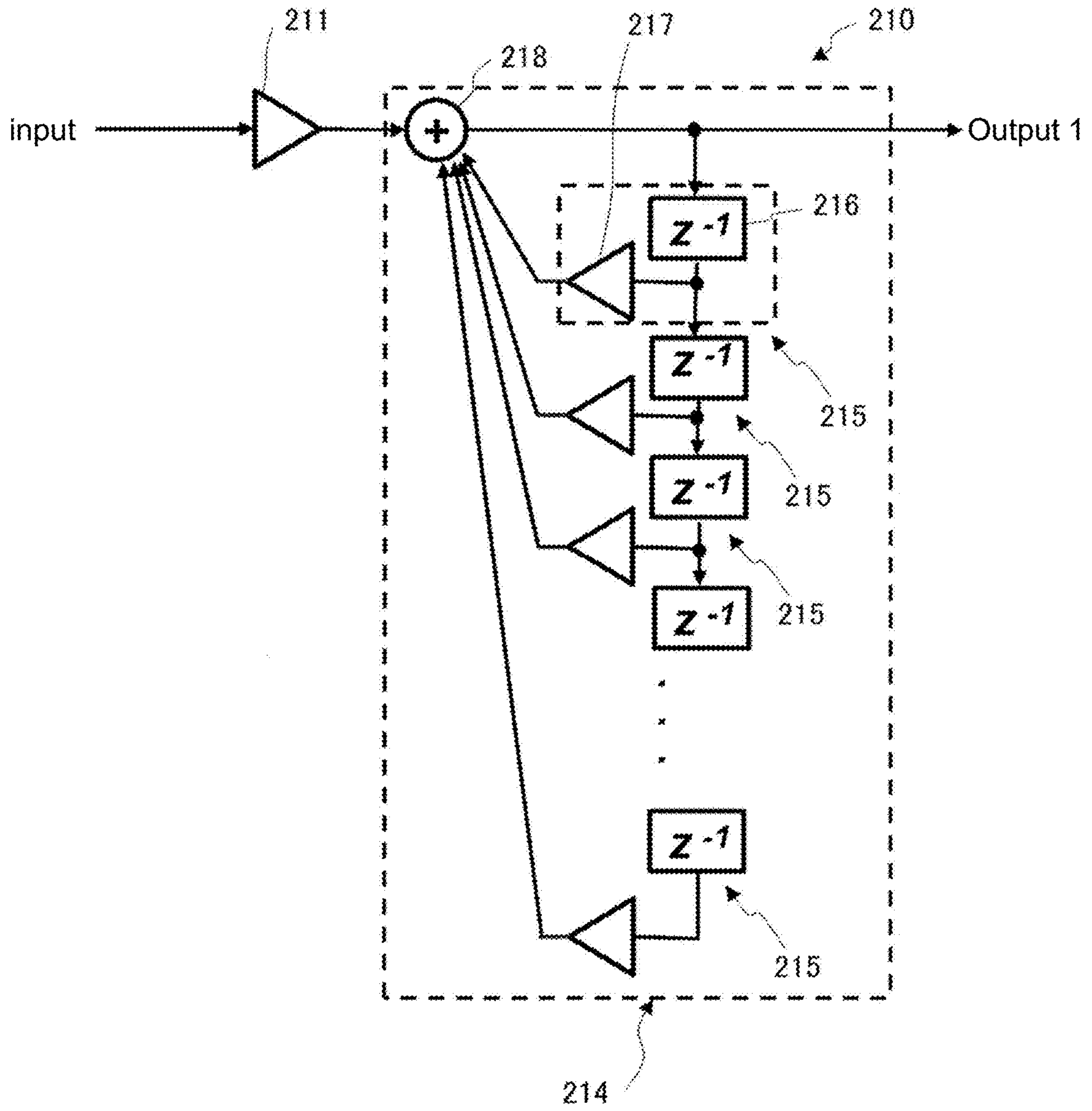
FIG. 5 is a block diagram illustrating an example of the all-pole filter (IIR filter).

FIG. 5 is a block diagram illustrating an example of the all-pole filter (IIR filter) 210. In FIG. 5, the all-pole filter 210 includes a multiplier 211 to which an input signal (input) is input and a feedback system (FB system) 214 which outputs an output signal (output 1). The input signal is a sound signal.

The multiplier 211 multiples an input signal x[t] by a predetermined coefficient (gain). An output signal of the multiplier 211 is input to an adder 218 of the FB system 214.

The FB system 214 includes the adder 218 and k taps 215. Each tap 215 includes a delay block 216 corresponding to one sample and a multiplier 217, and an output of the multiplier 217 is added by the adder 218.

Figure 6:
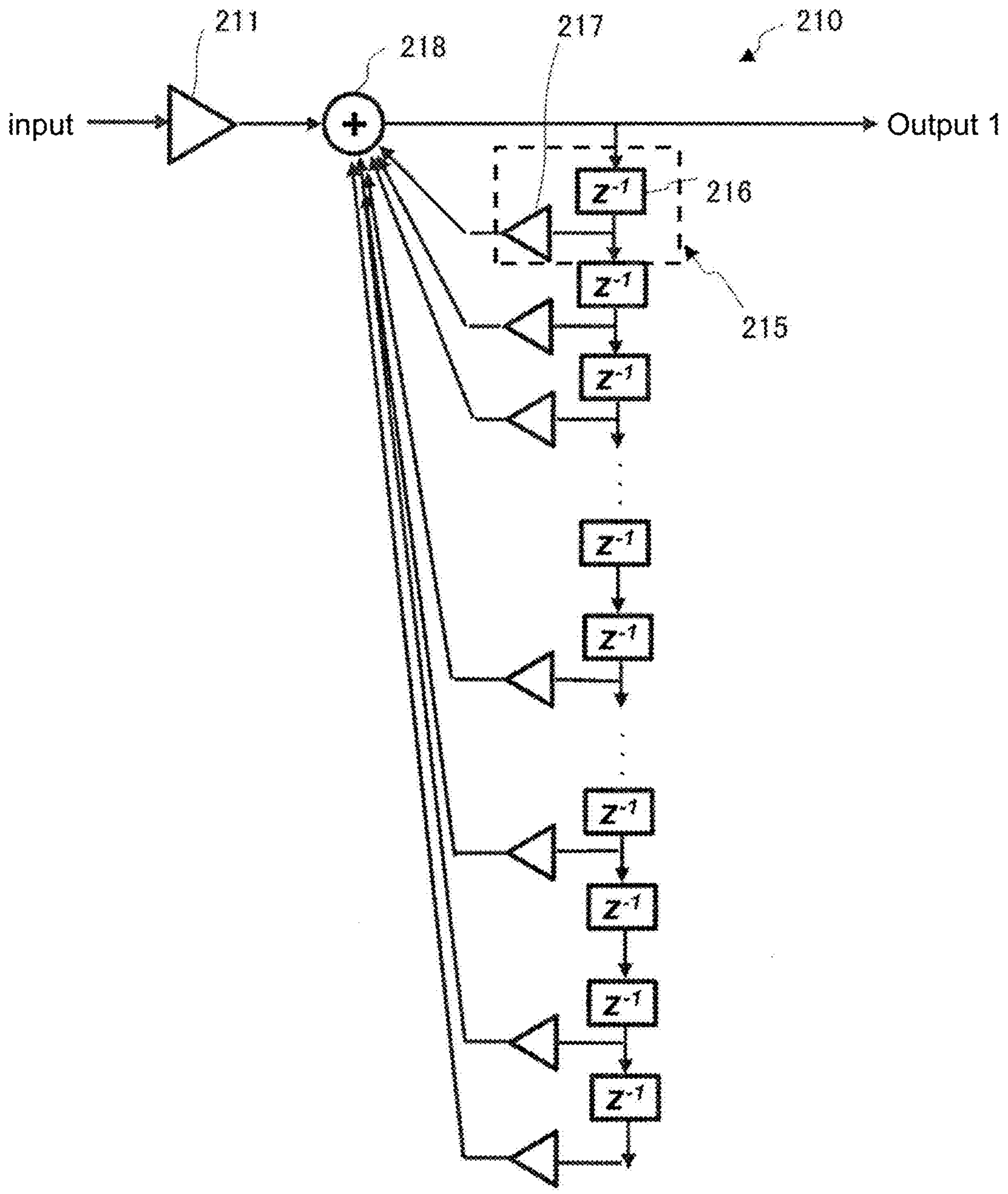
FIG. 6 illustrates the all-pole filter in which a coefficient is sparse.

The number of taps 215 is determined by the order k. It is possible to cause the coefficients to be sparse in accordance with user setting (designation of the number of coefficients (order)). For example, the user can designate the order (the number of taps 215) using the input device 154 of the PC 150. In a case in which the user designates 5000 as the order, for example, the processor 151 selects 5000 taps 215 in a descending order of the absolute values of the coefficients of the multiplier 217, and sets the coefficients of the remaining taps 215 to zero. It is thus possible to cause the coefficients to be sparse and to reduce the amount of computation. FIG. 6 illustrates the all-pole filter 210 in which the coefficients have become sparse. Also, the selection method of the taps 215 is not limited to the above method. However, the aforementioned processing for changing the order and processing for causing the coefficients to be sparse may be performed by the control unit 110 of the sound effect generation device 10 in some cases. Also, the example in which the coefficients are selected in a descending order of the absolute values of the coefficients has been described as an illustrative example of the predetermined selection method. However, a method other than the selection method in the illustrative example, for example, selection in an ascending order of the absolute values of the coefficients or random selection may be employed in some cases.

It is possible to generate and output an output signal y[t] with features of the impulse response while reducing the amount of computation using a high-order IIR filter (all-pole filter 210) obtained by converting the FIR filter instead of the FIR filter.

<<Comb Filter>>

In a case in which a reverberation time is short in the FIR, it is possible to generate a reverberant sound merely by employing the all-pole filter 210. However, in a case in which the reverberation time is long, it is necessary to increase the data (amount of computation) of the all-pole filter 210. The comb filter 220 is used to generate a reverberant sound with a desired reverberation time while curbing the amount of computation in the all-pole filter 210.

Also, even the same sound has different properties of the reverberant sound (that is, the impulse response) for various reasons such as wideness of a space, presence of objects that reflect the sound, materials and shapes of walls, and the like in the place where the impulse response is measured.

Figure 7A:
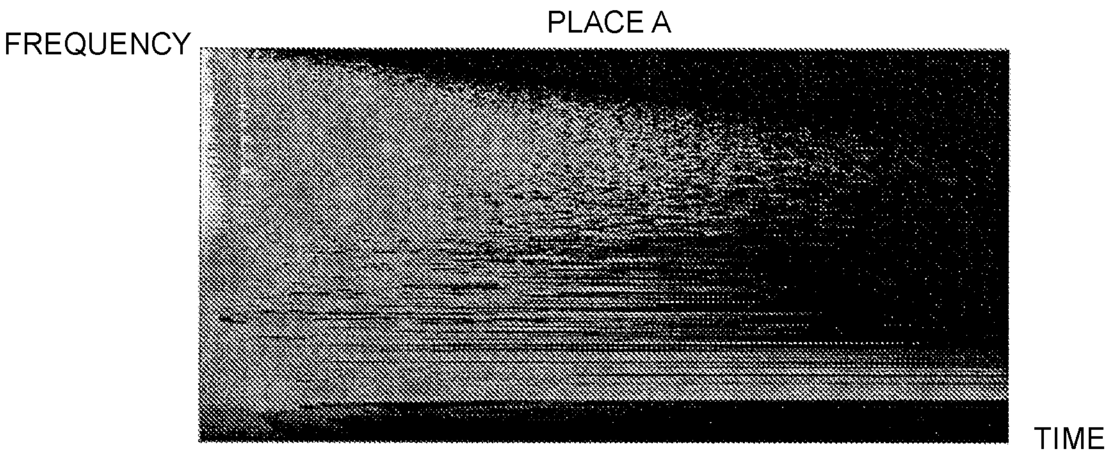
FIGS. 7A, 7B, and 7C illustrate frequency properties of impulse responses acquired for the same sound at mutually different places A, B, and C.
Figure 7B:
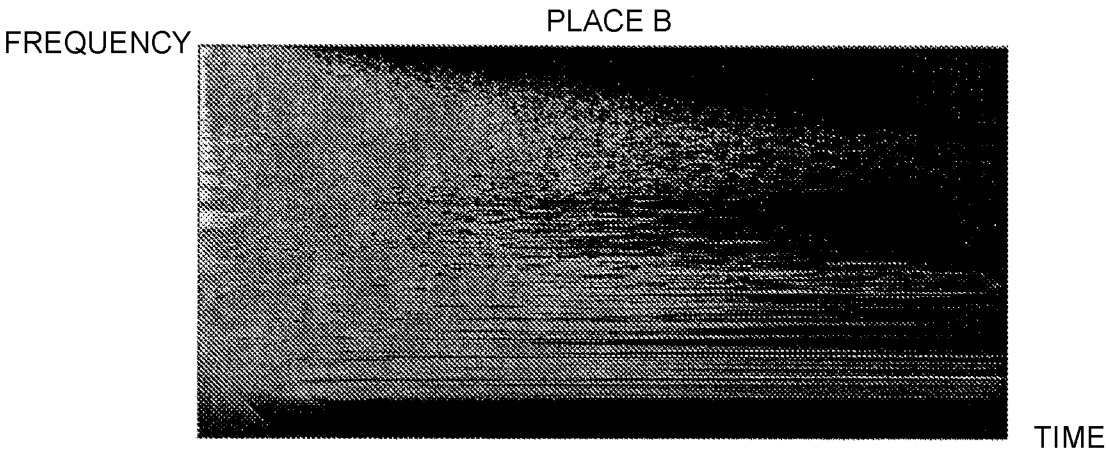
Figure 7C:
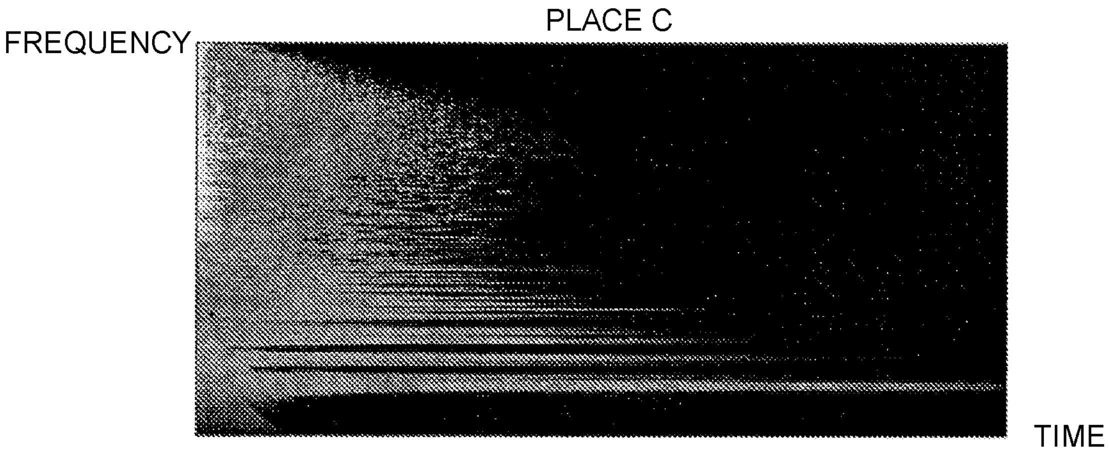

FIGS. 7A, 7B, and 7C illustrate frequency properties of impulse responses acquired for the same sound at mutually different places A, B, and C. The vertical axis represents a frequency, and a horizontal axis represents a time, in FIGS. 7A, 7B, and 7C. As illustrated in FIGS. 7A, 7B, and 7C, how each band is attenuated is different due to differences in places where the impulse responses are measured. There has also been a requirement to reproduce such an attenuation condition of each band.

Figure 8:
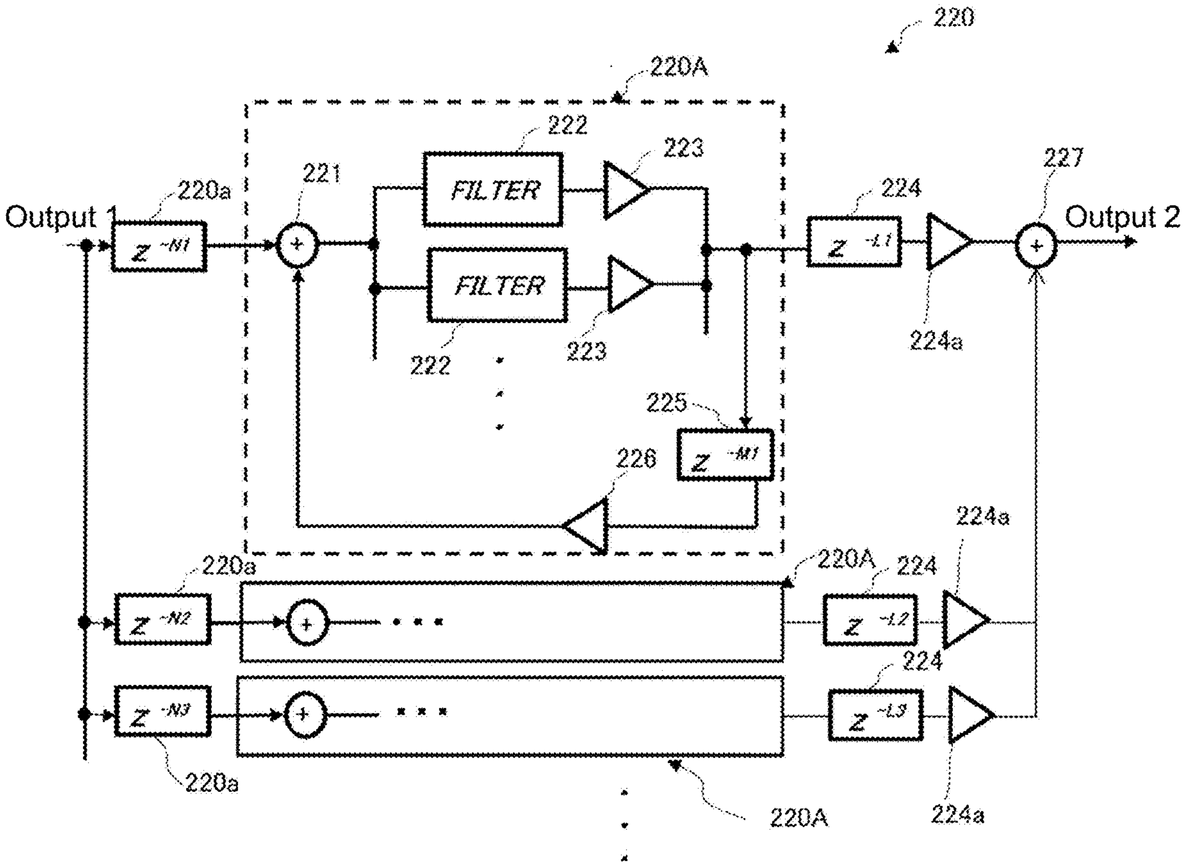
FIG. 8 illustrates a configuration example of the comb filter.

FIG. 8 illustrates a configuration example of the comb filter 220. In the example illustrated in FIG. 8, the comb filter 220 includes a plurality of delay blocks 220*a* to which the output signal (output 1) of the all-pole filter 210 is input in parallel and a comb filter module 220A connected to each of the delay blocks 220*a*. The comb filter 220 further includes delay blocks 224, each of which is connected to each comb filter module 220A, a multiplier 224*a* connected to each of the delay blocks 224, and an adder 227 that adds outputs of the multiplier 224*a*. An output of the adder 227 is output as an output signal (output 2) of the comb filter 220.

Although the example in which two or more systems, each of which includes from the delay blocks 220*a* to the multiplier 224*a*, are provided in parallel has been described in the example illustrated in FIG. 8, the comb filter 220 may have only one system described above. It is a matter of course that density of reverberant sounds increases by including a plurality of systems.

N1, N2, N3, . . . of the delay blocks 220*a* indicate that each of the delay blocks 220*a* has a different degree of delay. The comb filter module 220A includes an adder 221, a pair of a filter 222 and a multiplier 223, a delay block 225, and a multiplier 226. One or more appropriate number of pairs of the filters 222 and the multipliers 223 are included, and each output is connected to the delay blocks 224 and 225.

The filter 222 is an HPF, a BPF, an LPF, or an arbitrary combination thereof and allows components of a predetermined band (a frequency range) in a signal input to the filter 222 to pass therethrough. The multiplier 223 attenuates the signal passing through (extracted by) the filter 222 at a predetermined attenuation rate (coefficient). In this manner, the filter 222 operates as an extraction unit that extracts a predetermined band (specific band component), and the multiplier 223 operates as an attenuation unit that attenuates a predetermined band at a predetermined attenuation rate. The band passing through the filter 222 (specific band component) differs depending on the filter 222. Also, the coefficient (attenuation rate) of the multiplier 223 differs depending on the multiplier 223.

The band passing through the filter 222 and the coefficient of the multiplier 223 are data included in a parameter set of the comb filter 220. The parameter set of the comb filter 220 is generated by the PC 150. As illustrated in FIGS. 7A, 7B, and 7C, data indicating reverberant sound properties at the place where the IR is measured is input to the PC 150. Then, the processor 151 generates the passing band and the coefficient to be set for the pair of the filter 222 and the multiplier 223 of each comb filter module 220A in accordance with a predetermined algorithm. The passing band and the coefficient may be generated in manual setting. Also, the number of pairs included in each comb filter module 220A may be set in some cases. Moreover, the number and the degrees of delay of the comb filter modules 220A may be appropriately set in accordance with the reverberant sound properties.

The parameter set of the comb filter 220 is read from the memory 152, is transmitted from the communication I/F 153 to the communication I/F 105 of the sound effect generation device 10, and is stored in the storage unit 120 similarly to the parameter set of the all-pole filter 210. The control unit 110 (FIG. 2) brings the comb filter 220 into an activated state by setting the passing band and the coefficient for each pair of the filter 222 and the multiplier 223 in each comb filter module 220A.

The delay block 225 provides a predetermined delay to outputs of the plurality of sets of the filters 222 and the multipliers 223, and the multiplier 226 multiplies an output of the delay block 225 by a predetermined coefficient. An output of the multiplier 226 is input to the adder 221. The multiplier 226 is adapted to define a loop gain of the comb filter module 220A, and a remaining time increases as the coefficient of the multiplier 226 increases.

The delay block 224 has different degrees of delay (L1, L2, L3, . . . ) and provides a predetermined delay to an output signal from the comb filter module 220A. Also, one of the delay block 220*a* and the delay block 224 may be omitted. However, both the delay block 220*a* and the delay block 224 may be provided, and a unit delay provided by the delay block 220*a* may be differentiated from a unit delay provided by the delay block 224 to subdivide the degrees of delay.

In the PC 150, a plurality of parameter sets for the all-pole filter 210 and the comb filter 220 in accordance with a plurality of measurement places is generated from data of the impulse responses (data of reverberant sound properties)

in regard to different places where sounds are output (that is, places where the impulse responses (IRs) are measured) as illustrated in FIGS. 7A, 7B, and 7C. The plurality of parameter sets is sent to the sound effect generation device 10 through communication and is stored in the storage unit 120.

In other words, the storage unit 120 illustrated in FIG. 3 stores the plurality of parameter sets in accordance with properties of impulse responses at different places where sounds are output (that is, places where the impulse responses (IRs) are measured) as illustrated in FIGS. 7A, 7B, and 7C. In a case in which the DSP 200 is caused to operate as the all-pole filter 210 and the comb filter 220 through setting of the parameter sets, the control unit 110 may be able to adjust the coefficients and the order related to the all-pole filter 210, the passing band and the coefficients related to the comb filter 220, a reverberant time, and the like in accordance with a user's instruction or the like using the UI 104.

Figure 9A:
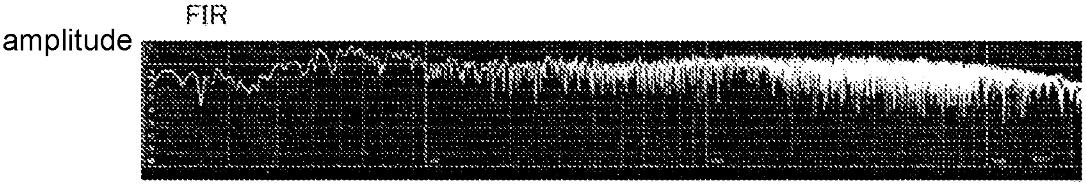
FIG. 9A illustrates a frequency property of a reverberant sound using an FIR filter.
Figure 9B:
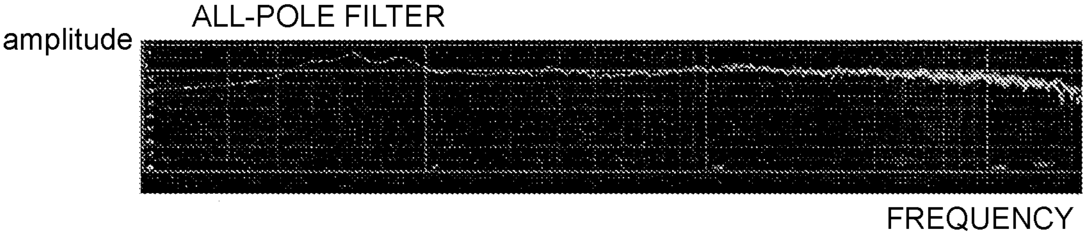
FIG. 9B illustrates a frequency property of a reverberant sound using the all-pole filter.
Figure 9C:
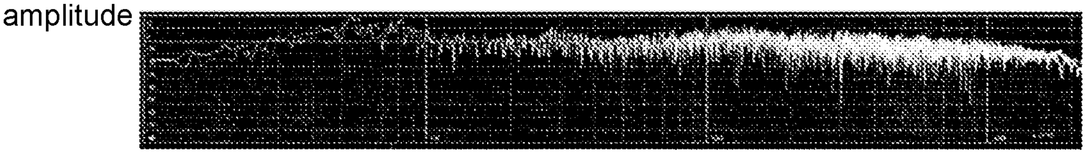
FIG. 9C illustrates a frequency property of a reverberant sound using the all-pole filter and the comb filter.

FIG. 9A illustrates frequency properties of a reverberant sound using the FIR filter, FIG. 9B illustrates frequency properties of a reverberant sound using the all-pole filter 210, and FIG. 9C illustrates a frequency property of a reverberant sound using the all-pole filter 210 and the comb filter 220. If the all-pole filter 210 and the comb filter 220 are used, it is possible to cause the waveform to approach the waveform obtained by the FIR filter and to cause the properties of the reverberant sound to approach those obtained in a case in which the FIR filter is used while reducing the amount of computation.

<Recording and Reproduction of Sound Effect>

An output signal of the comb filter 220 (DSP 200) is a signal obtained by adding a reverberant sound signal to a sound signal, and such a signal is converted into an analog signal by the D/A converter 40, is amplified by the amplifier, and is then output from the speaker.

The parameter set for the all-pole filter 210 and the parameter set for the comb filter 220 may be stored in the storage unit 120 by the control unit 110. Thereafter, the control unit 110 can reproduce the all-pole filter 210 and the comb filter 220 by reading the parameter sets as needed and setting the parameter sets in the DSP 200.

As described above, data of the plurality of parameter sets for the all-pole filter 210 or a combination of the all-pole filter 210 and the comb filter 220 at a plurality of places where the impulse responses are measured may be stored in the storage unit 120, and the user may be able to designate a measurement place (a place (such as a building) where the user desires to listen to the sound) using the UI 104. Also, parameter sets at a plurality of measurement locations (for example, at seat locations, on a stage, and the like) may be further stored in regard to each measurement place to allow the user perform designation.

<Processing Performed by PC and Sound Effect Generation Device>

Hereinafter, processing performed by the PC 150 and the sound effect generation device 10 will be described.

<<Parameter Set Generation Processing>>

Figure 10:
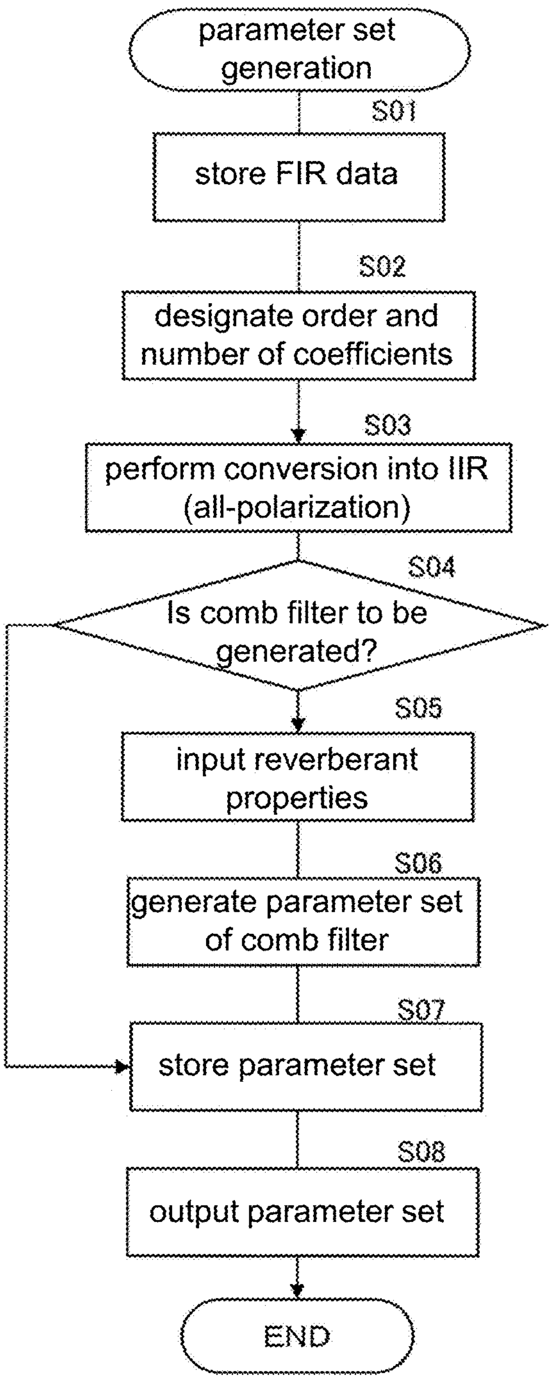
FIG. 10 is a flowchart illustrating an example of parameter set generation processing.

FIG. 10 is a flowchart illustrating an example of a parameter set generation processing performed by the PC 150. The processing in FIG. 10 is executed at every measurement place or measurement location of the IR. In FIG. 10, if FIR data is stored in the memory 152 of the PC 150 (S01), then the processor 151 performs the following processing through execution of a program. In other words, the processor 151 displays, on the display 155, a screen that promotes designation and an input of the order and the number of coefficients and receives the order and the number of coefficients input from the input device 154 (S02). Then, the processor 151 performs all-polarization (conversion into the IIR) processing of the FIR data using the designated order and the number of coefficients (S03). The method for all-polarization is as described above.

The processor 151 changes the order and generates the all-pole filter 210 in which the coefficients are sparse in the processing in S03. In S04, the processor 151 determines whether to generate the comb filter 220. In a case in which it is determined that the comb filter 220 is to be generated, the processing proceeds to S05, and the processing proceeds to S07 in the other case. In a case in which the comb filter 220 is not to be generated, the coefficient of the multiplier 230 in FIG. 2 is set to zero, and an output from the comb filter 220 is brought into a zero state.

In S05, the processor 151 receives reverberant sound property data at measurement places input from the input device 154. In S06, the processor 151 generates the parameter set of the comb filter 220 using the aforementioned method.

In S07, the processor 151 stores (saves) the parameter set of the all-pole filter 210 and the parameter set (if generated) of the comb filter 220 in the memory 152. In S08, the processor 151 outputs the parameter sets. For example, the processor 151 transmits the parameter set of the all-pole filter 210 and the parameter set (if generated) of the comb filter 220 to another device such as a sound effect generation device 10 using the communication I/F 153. The output destination of the parameter sets at this time may be an external storage device (for example, a USB memory) connected to the PC 150. Also, each parameter set may be combined at the time of compiling of firmware of the sound effect generation device 10.

<<Sound Effect Addition Processing>>

Figure 11:
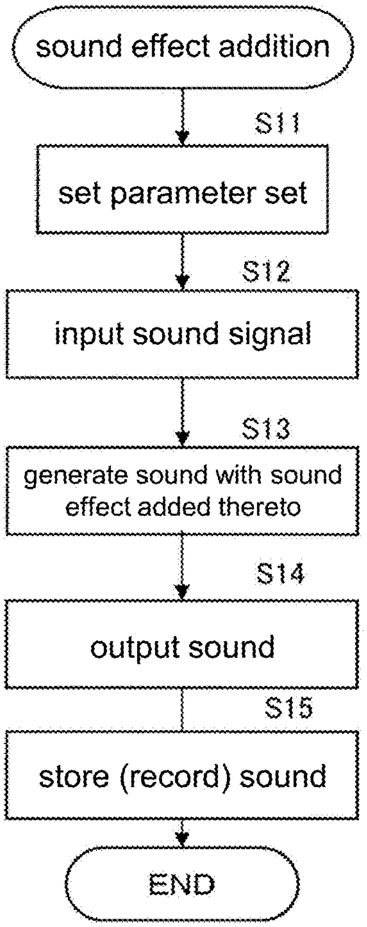
FIG. 11 is a flowchart illustrating an example of sound effect addition processing.

FIG. 11 is a flowchart illustrating an example of sound effect addition processing performed by the sound effect generation device. The processing illustrated in FIG. 11 is performed by the DSP 200. In S11, the CPU 101 that operates as the control unit 110 through execution of a program performs setting based on the parameter sets of the all-pole filter 210 and the comb filter 220 in the DSP 200.

In S12, if an input of a sound signal to the DSP 200 is started, then the DSP 200 operates as the all-pole filter 210 and the comb filter 220 and generates (S13) and outputs (S14) a sound signal obtained by adding a sound effect (a reverberant sound at a measurement place) to an input sound signal. A sound based on the sound signal output from the DSP 200 is output from the speaker. Also, the control unit 110 performs processing of storing a sound file (sound data) based on the sound signal in the storage unit 120 (S15).

<Selection of Measurement Place and Measurement Location>

FIG. 12 illustrates an example of a parameter set designation screen displayed on the display device (touch panel) included in the UI 104. In the example in FIG. 12, a plurality of measurement places and a plurality of measurement locations at each measurement place are displayed, such that a measurement place and a measurement location (a measurement place and a measurement location of an impulse response) can be designated. However, the number of measurement places and locations of the impulse responses can be appropriately selected. In other words, only a measurement place (site) may be able to be designated, or one of a plurality of locations at one measurement place may be able to be selected. In this case, each of the plurality of measurement locations corresponds to the "measurement place".

Figure 13:
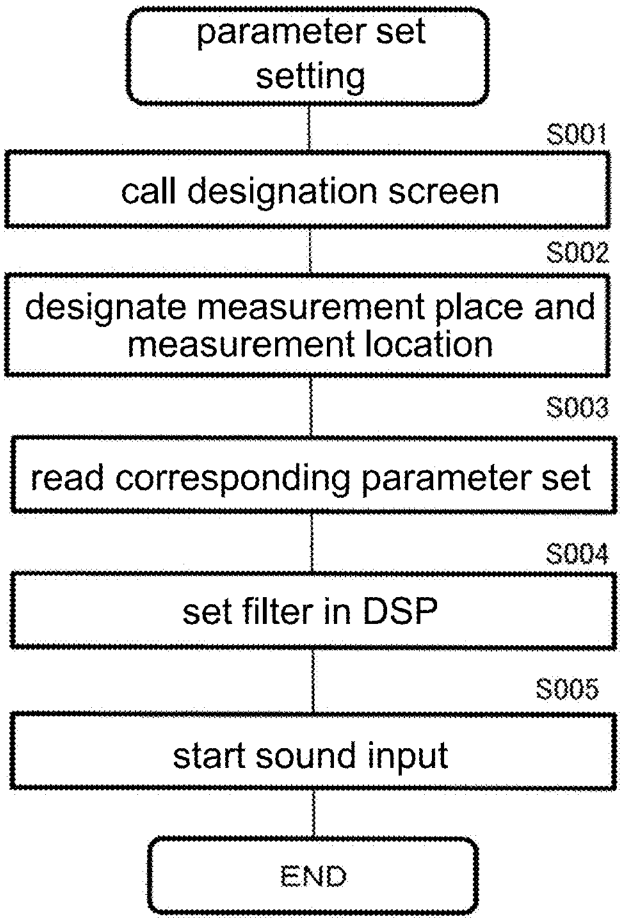
FIG. 13 is a flowchart illustrating an example of parameter set designation processing.

FIG. 13 is a flowchart illustrating an example of parameter set designation processing. The user operates the UI 104 to input an instruction for calling the parameter set designation screen. Then, the control unit 110 displays the designation screen on the display device included in the UI 104 (S001). The user designates a measurement place and a measurement location through touching with reference to the designation screen (S002). The designation input is provided from the UI 104 to the control unit 110, the control unit 110 reads parameter sets corresponding to the designated measurement place and the measurement location from the storage unit 120 (S003) and sets the parameter sets in the DSP 200 (the all-pole filter 210 or the all-pole filter 210 and the comb filter 220) (S004). Thereafter, the user operates the UI 104 and starts to input a sound signal to the DSP 200 (S005). Then, a state in which a sound with the sound effect based on the set parameter sets added thereto is output is achieved. Moreover, a specification in which only one of the measurement place and the measurement location can be designated in S002 may be employed in some cases.

In this manner, a user such as a player of an electronic musical instrument and an audience of a reproduced sound can listen to a sound to which a reverberant sound at a desired measurement place and measurement location is reflected. For example, it is possible for the player to know how the sound (music sound) can be listened to depending on differences in seat at a certain performance place (such as a concert hall). Also, the audience of the reproduced sound can listen to a sound to which a reverberant sound at a sound output place where the audience has never been or cannot go is reflected.

Also, a digital signal of a sound signal with a reverberant sound added thereto, which is output from the comb filter 220 (DSP 200), may be acquired by the control unit 110 (CPU 101), and the digital signal may be converted into data of a predetermined sound file format and may be stored in the storage unit 120. Thereafter, the control unit 110 may perform reproduction and an output of the sound signal in accordance with an instruction input from the UI 104. In other words, sound signals with a plurality of reverberant sounds added thereto may be generated in regard to a plurality of mutually different pieces of IR data, and the digital data may be saved in the storage unit 120 and reproduced and output in accordance with an instruction from the user.

Effects of Embodiment

According to the sound effect generation device (sound effect addition device) of the embodiment, it is possible to reduce the amount of computation by employing the all-pole filter 210 with the coefficient generated on the basis of an actual measurement value of the impulse response. Also, it is possible to generate a sound effect with satisfactory quality. Moreover, a configuration of changing an order in accordance with designation of the order of the all-pole filter 210 is employed. It is thus possible to reduce the amount of computation.

Also, in the embodiment, the processor 151 selects a designated number of coefficients in accordance with a predetermined selection method (a descending order of absolute values of the coefficients) and sets values of the remaining coefficients to zero in a case in which the number of coefficients to be set in the all-pole filter 210 is designated. It is thus possible to reduce the amount of computation.

Also, in the embodiment, the sound effect with a reverberation property at a measurement location of an impulse response is generated using the comb filter 220 that has at least one comb filter module 220A that has two or more sets, each of which includes the filter (extraction unit) 222 that extracts a specific band component from a sound effect and a multiplier (attenuation unit) 223 that attenuates the extracted specific band component at a predetermined attenuation rate. It is possible to generate a reverberant sound that reproduces how each band is attenuated at the measurement place of the impulse response in a state in which the amount of computation is curbed, by employing such comb filter 220. It is thus possible to obtain a reverberant sound (sound effect) with satisfactory quality while reducing the amount of computation.

Also, in the present embodiment, a configuration in which the impulse response is selected from a plurality of impulse responses measured at a plurality of mutually different places where the impulse responses are measured is employed. In other words, in the present embodiment, the parameter sets of the all-pole filter 210 and the comb filter 220 are stored for a plurality of different output places and a plurality of locations at each of the output places, such that reverberant sounds at different places where the impulse responses are measured at different measurement locations can be listened to by selecting the parameter sets. The configurations described in the embodiment can be appropriately combined without departing from the objective.

REFERENCE SIGNS LIST

10 Sound effect generation device
101 CPU
102 Main storage device
103 Auxiliary storage device
110 Control unit
120 Storage unit
151 Processor
152 Memory
200 DSP
210 All-pole filter
220 Comb filter
220A Comb filter module
222 Filter
223 Multiplier

What is claimed is:

1. An electronic musical instrument comprising:

a high-order-all-pole IIR filter that outputs a sound signal which is formed on a basis of an actual measurement value of an impulse response at a measurement place selected from a plurality of impulse responses acquired at a plurality of measurement places and is obtained by adding a reverberant sound at the selected measurement place to an input sound signal, the high-order-all-pole IIR filter comprises an adder in which an audio signal is inputted and a plurality of taps connected in multiple stages to an output terminal of the adder, each of the plurality of taps includes a delay circuit and a multiplier, the delay circuit includes an input terminal connected to the output terminal of the adder or an output terminal of a delay circuit of a previous tap, the delay circuit further includes an output terminal connected to an input terminal of a delay circuit of the subsequent tap and an input terminal of the multiplier, the multiplier outputs a signal obtained by multiplying an output signal of the delay circuit inputted to the input terminal of the multiplier by a predetermined coefficient, and an output signal of the multiplier is inputted to the adder.

2. The electronic musical instrument according to claim 1, further comprising:

a generation unit that generates a sound effect with respect to a sound by using the high-order-all-pole IIR filter having a plurality of coefficients generated on a basis of the actual measurement value of the impulse response, wherein the sound effect includes the reverberant sound at the selected measurement place; and an output unit that outputs the sound effect.

3. The electronic musical instrument according to claim 1, further comprising:

a control unit that changes an order of the high-order-all-pole IIR filter in accordance with designation of the order of the high-order-all-pole IIR filter.

4. The electronic musical instrument according to claim 2, wherein in a case that a number of coefficients set for the high-order-all-pole IIR filter is designated, the control unit selects the designated number of coefficients in accordance with a predetermined selection method and sets values of remaining coefficients to zero.

5. The electronic musical instrument according to claim 2, comprising:

a comb filter comprising at least one comb filter module that comprises one or more sets, each of which comprises an extraction unit that extracts a specific band component from the sound effect and an attenuation unit that attenuates the extracted specific band component at a predetermined attenuation rate and the comb filter generates the sound effect with a reverberation property at a location where the impulse response is measured.

6. The electronic musical instrument according to claim 5, wherein the specific band component and the predetermined attenuation rate are generated on a basis of the actual measurement value of the impulse response.

7. An information processing device comprising:

a generation unit that generates a sound effect with respect to a sound by using a high-order-all-pole IIR filter having a plurality of coefficients generated on a basis of an actual measurement value of an impulse response; and an output unit that outputs the sound effect, wherein the high-order-all-pole IIR filter comprises an adder in which an audio signal is inputted and a plurality of taps connected in multiple stages to an output terminal of the adder, each of the plurality of taps includes a delay circuit and a multiplier, the delay circuit includes an input terminal connected to the output terminal of the adder or an output terminal of a delay circuit of a previous tap, the delay circuit further includes an output terminal connected to an input terminal of a delay circuit of the subsequent tap and an input terminal of the multiplier, the multiplier outputs a signal obtained by multiplying an output signal of the delay circuit inputted to the input terminal of the multiplier by a predetermined coefficient, and an output signal of the multiplier is inputted to the adder.

8. The information processing device according to claim 7, further comprising:

a control unit that changes an order of the high-order-all-pole IIR filter in accordance with designation of the order of the high-order-all-pole IIR filter.

9. The information processing device according to claim 7, wherein in a case that a number of coefficients set for the high-order-all-pole IIR filter is designated, the control unit selects the designated number of coefficients in accordance with a predetermined selection method and sets values of remaining coefficients to zero.

10. The information processing device according to claim 7, comprising:

a comb filter comprising at least one comb filter module that comprises one or more sets, each of which comprises an extraction unit that extracts a specific band component from the sound effect and an attenuation unit that attenuates the extracted specific band component at a predetermined attenuation rate and the comb filter generates the sound effect with a reverberation property at a location where the impulse response is measured.

11. The information processing device according to claim 10, wherein the specific band component and the predetermined attenuation rate are generated on a basis of the actual measurement value of the impulse response.

12. The information processing device according to claim 10, wherein the control unit sets a parameter set selected from a plurality of parameter sets stored in regard to at least one of the high-order-all-pole IIR filter and the comb filter corresponding to the plurality of impulse responses for at least one of the corresponding high-order-all-pole filter and the at least one comb filter.

13. The information processing device according to claim 7, wherein the impulse response is selected from a plurality of impulse responses measured at mutually different places.

14. A sound effect generation method comprising:

generating a sound effect with respect to a sound by using a high-order-all-pole IIR filter having a plurality of coefficients generated on a basis of an actual measurement value of an impulse response; and outputting the sound effect, wherein the high-order-all-pole IIR filter comprises an adder in which an audio signal is inputted and a plurality of taps connected in multiple stages to an output terminal of the adder, each of the plurality of taps includes a delay circuit and a multiplier, the delay circuit includes an input terminal connected to the output terminal of the adder or an output terminal of a delay circuit of a previous tap, the delay circuit further includes an output terminal connected to an input terminal of a delay circuit of the subsequent tap and an input terminal of the multiplier, the multiplier outputs a signal obtained by multiplying an output signal of the delay circuit inputted to the input terminal of the multiplier by a predetermined coefficient, and an output signal of the multiplier is inputted to the adder.

15. The sound effect generation method according to claim 14, wherein an order of the high-order-all-pole IIR filter is changed in accordance with designation of the order of the high-order-all-pole IIR filter.

16. The sound effect generation method according to claim 14, wherein in a case in which a number of coefficients to be set for the high-order-all-pole IIR filter is designated, the designated number of coefficients are selected in accordance with a predetermined selection method, and values of remaining coefficients are set to zero.

17. The sound effect generation method according to claim 14, wherein a second sound effect with a reverberation property at a location where the impulse response is measured is generated using a comb filter comprising at least one comb filter module that comprises one or more sets, each of which comprises an extraction unit that extracts a specific band component from the sound effect and an attenuation unit that attenuates the extracted specific band component at a predetermined attenuation rate.

18. The sound effect generation method according to claim 17, wherein the specific band component and the predetermined attenuation rate are generated on a basis of the actual measurement value of the impulse response.

19. The sound effect generation method according to claim 17, comprising storing a plurality of parameter sets related at least to one of the high-order-all-pole IIR filter and the comb filter corresponding to the plurality of impulse responses, and setting a parameter set selected from the plurality of parameter sets for at least one of the corresponding high-order-all-pole filter and the comb filter.

20. The sound effect generation method according to claim 14, wherein the impulse response is selected from a plurality of impulse responses measured at mutually different places.

* * * * *